United States Patent [19]

Harding

[11] Patent Number: 4,793,840

[45] Date of Patent: Dec. 27, 1988

[54] OPTICAL FIBRE MANUFACTURE

[75] Inventor: Ian D. Harding, Saffron Walden, Great Britain

[73] Assignee: STC PLC, London, England

[21] Appl. No.: 896,518

[22] Filed: Aug. 14, 1986

[30] Foreign Application Priority Data

Aug. 21, 1985 [GB] United Kingdom ............... 8520945

[51] Int. Cl.⁴ .......................................... C03B 37/023
[52] U.S. Cl. ........................................ 65/2; 65/10.1;
65/13; 65/29; 65/31.11
[58] Field of Search ............... 65/2, 3.11, 13, 10.1, 65/29

[56] References Cited

U.S. PATENT DOCUMENTS

| 4,123,242 | 10/1978 | Imoto et al. | 65/2 X |
| 4,145,201 | 3/1979 | Phillips | 65/2 |
| 4,147,526 | 4/1979 | Lonberger | 65/2 X |
| 4,317,666 | 3/1982 | Faure et al. | 65/2 |
| 4,523,938 | 6/1985 | Grego | 65/2 |

Primary Examiner—Robert L. Lindsay
Attorney, Agent, or Firm—Lee & Smith

[57] ABSTRACT

Optical fibre (4) is drawn from a preform (1) by a capstan (5), and a control circuit (22) drives the capstan and the preform at respective predetermined rates during ramp-up. The capstan drive rate is modified (controller 31) in response to deviations from the nominal fibre diameter as measured by a fibre diameter monitor (9) over short-term periods, and the preform feed rate (20) is modified (algorithm 21) to maintain an average fibre pulling rate within ±5% of the present pulling rate, to thus control the glass melting rate.

3 Claims, 1 Drawing Sheet

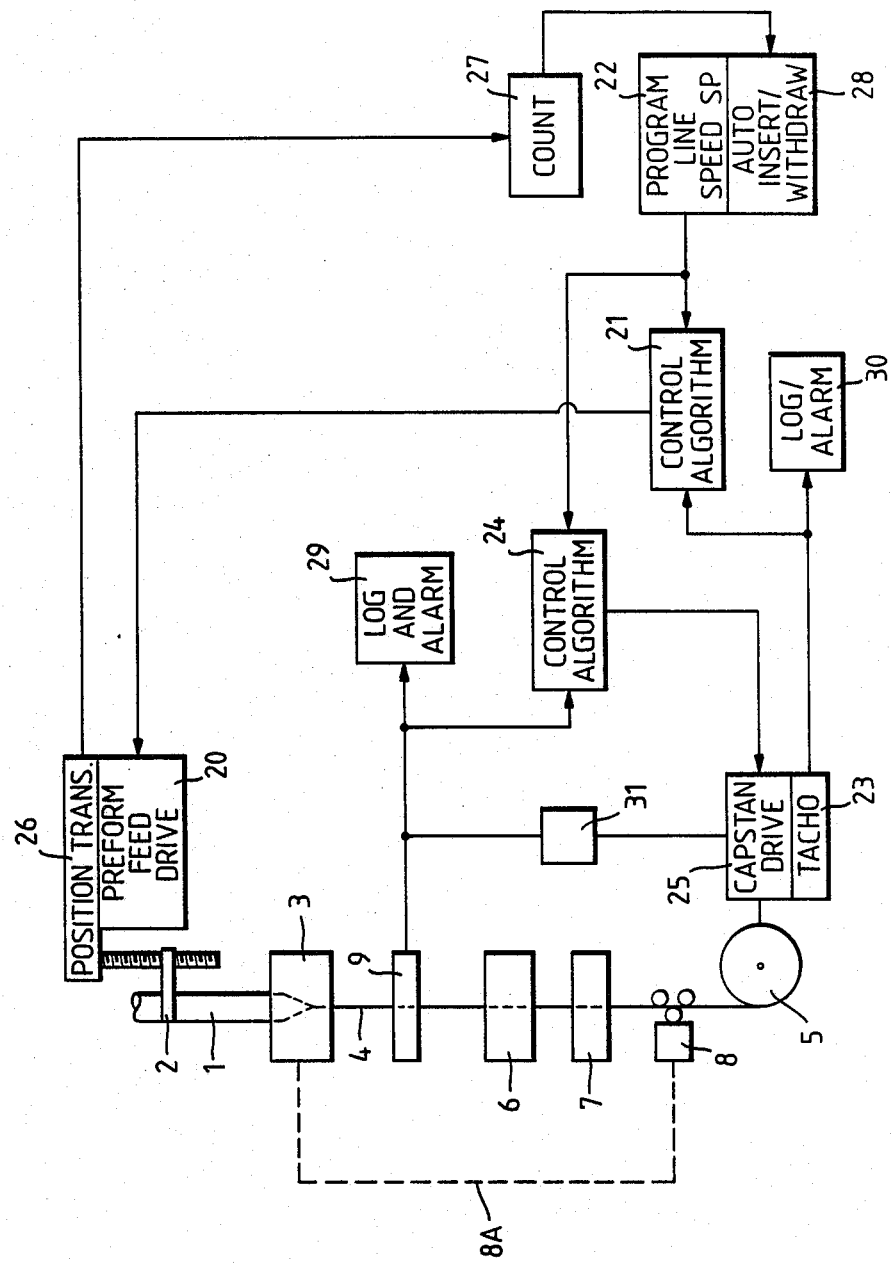

OPTICAL FIBRE MANUFACTURE

BACKGROUND OF THE INVENTION

This invention relates to the manufacture of optical fibre, particularly high quality optical fibre for telecommunication cables and systems.

Our British patent application No. 8323692 describes and claims an optical fibre pulling tower constructed of a synthetic epoxy granite. We have found that this provides a resonant-free structure which is the key to manufacturing high quality fault-free fibre at high speed. This patent specification also shows how the fibre diameter is measured by a diameter measuring device and the capstan draw-off rate is dependent upon this and the preform feed rate to maintain constant fibre diameter.

However the preform is normally not of constant diameter, however hard one has tried to make it so. There are small variations in diameter and as the preform is fed into the furnace these variations in diameter can affect the resultant diameter of the pulled fibre.

We have found the conditions inside the furnace are critical to pulling a high quality low-loss fibre; in particular the flow rate of glass through the furnace at a predetermined furnace temperature and a predetermined fibre diameter must remain within close limits.

It is an object of the present invention to provide an improved arrangement for maintaining precise control of the optical fibre being drawn.

SUMMARY OF THE INVENTION

According to the present invention there is provided a method of manufacturing optical fibre comprising feeding an optical fibre preform into a furnace at a first predetermined rate, pulling a fibre from the preform around the capstan at a second predetermined rate, said first and second predetermined rates being calculated to produce a fibre of a predetermined nominal diameter, sensing the diameter of the drawn optical fibre and providing a signal representative of a deviation of the measured diameter from the nominal diameter, and modifying the speed of the capstan in response to the deviation signal from the diameter monitor, whereby to tend to maintain the optical fibre as close as possible to the nominal preset diameter, and controlling the glass melting rate by varying the preform feed drive rate to maintain an average fibre pulling rate close to the second predetermined rate.

According to another aspect of the present invention there is provided apparatus for manufacturing optical fibre comprising means for holding an optical fibre preform, a furnace for melting the tip of the preform, means for feeding the preform into the furnace, means for sensing the fibre diameter, a capstan for drawing the fibre from the preform, and a control system arranged to drive the preform into the furnace at a first predetermined rate and to drive the capstan at a second predetermined rate, and wherein the capstan drive rate is modified over short-terms in response to deviation from the fibre nominal diameter as measured by the fibre diameter monitor, and means for automatically varying the first rate to maintain an average fibre pulling rate close to the second predetermined rate and thereby control the glass melting rate.

BRIEF DESCRIPTION OF THE DRAWINGS

In order that the invention can be clearly understood reference will now be made to the accompanying drawing which shows a block schematic diagram of fibre manufacturing apparatus according to an embodiment of the present invention.

DESCRIPTION OF THE PREFERRED EMBODIMENTS

Referring to the drawing an optical fibre preform 1 held in a chunk 2 is advanced slowly into a furnace 3 which melts the tip of the preform 1. An optical fibre 4 is drawn from the molten tip by a capstan 5. A primary coating is applied to the optical fibre 4 by a coating applicator 6, and a coating curing station 7 such as a U-V device, cures the coating.

The diameter of the fibre is measured by a diameter monitor 9.

The preform feed drive 20 controls the vertical positioning of the chuck 2 in which the preform is held and has a servo-motor (not shown). The preform 1 is fed into the furnace 3 by the preform feed drive 20 at a predetermined rate controlled by the control algorithm 21. Control algorithm 21 receives a programme line speed signal from the programme line speed control 22 and also a signal from the tachometer 23 providing a signal representative of the capstan speed. The diameter of the fibre is preset and any deviation from the preset figure is sensed by the monitor 9 and control algorithm 24 compares the deviation signal with the programme line speed signal 22 to adjust the capstan drive speed accordingly at the capstan drive control circuit 25.

During ramp-up, after an initial portion of fibre has been threaded through the coating applicator and the curing stage and around the capstan, at an initial pulling speed of 4 meters per minute, then the preform feed speed and capstan take-up speed are both rapidly increased under control of the computer through the program line speed 22 and control algorithms 21 and 24, respectively. When the preset line speed e.g. 120 meters per minute is achieved, the existing control loop from the diameter monitor is switched to an electronic controller 31 which takes over control of the capstan speed in response to changes in diameter represented by the deviation signal from the monitor 9., A position transducer 26 associated with the preform feed drive 20 is an incremental length transducer and provides signals, following an autoinsertion routine whereby the preform is inserted into the furnace during ramp-up, to initiate the withdrawal of the end portion of the preform when the usable body of the preform has been drawn, to initiate a ramp-down procedure. Autoinsert/withdrawal circuit 28 controls these functions and count circuit 27 measures the preform insertion as it proceeds.

The capstan speed is also controlled to maintain constant fibre diameter using the signal from the diameter monitor 9 at the set speed. The preform 1 will not have a constant diameter throughout its length. If an increased diameter portion enters the furnace it will tend to increase the diameter of the fibre. As soon as the commencement of any change is sensed by the monitor 9 the control controller 31 responds by making a short-term adjustment to the capstan drive 25 to increase the speed of the capstan 5 to thus tend to reduce the diameter and maintain it as its nominal preset value. A typical value would be 125 microns. Thus the controller 31 overrides the preset line speed for short-terms to prevent variations in preform diameter from affecting the diameter of the fibre drawn from the preform.

The long-term capstan drive speed is preset by the programme line speed 22. Suppose a stable situation exists with the capstan running at a speed slightly greater than the preset line speed and the fibre diameter monitor showing no deviation from the nominal diameter. The preform will be feeding glass at a particular rate i.e. so many hilograms per hour. The capstan speed however is greater than the nominal or preset speed which has been calculated beforehand based on data decrived from an earlier measurement on the preform e.g. average diameter, length and weight, and we have found that it is important not to deviate by more than ±5% of the preset values. Thus the control algorithm 21 functions to maintain long term control of the preform feed drive and will thus, in the situation described, attempt to increase slowly the preform feed rate to match the measured capstan speed. The capstan speed will still be subject to short-term adjustment by the diameter monitor 9 should that sense any deviation from the preset diameter.

In this way a predetermined glass through flow rate is maintained within ±5%.

The log plus alarm circuit 29 and 30 function to provide chart records and an alarm if the measured parameter goes outside preset boundaries.

The tensiometer 8 controls the temperature of the furnace 3 and a broken line 8A indicates this control loop. This is only applied during setting up the furnace and without applying a coating via the coating applicator 6. Thus the temperature e.g. 2000° C. representative of a desired tension e.g. 20 grams, is found by trial and this temperature used for future production pulls.

I claim:

1. A method of manufacturing optical fibre comprising feeding an optical fibre preform into a furnace at a first predetermined rate while operating the furnace at a predetermined temperature, pulling a fibre from the preform around a capstan at a second predetermined rate, said first and second predetermined rates being calculated to produce a fibre of a predetermined nominal diameter, sensing the diameter of the drawn optical fibre and providing a signal representative of a deviation of the measured diameter from the nominal diameter, and modifying the speed of the capstan in response to the deviation signal from the diameter monitor, whereby to tend to maintain the optical fibre as close as possible to the nominal preset diameter, and wherein a signal is derived representative of the rotational speed of the capstan, and this signal is compared with a signal representative of the predetermined second rate to derive a preform feed control signal for adjusting said first rate.

2. A method as claimed in claim 1, wherein the average fibre pulling rate remains within plus or minus 5% of the second predetermined rate.

3. Apparatus for manufacturing optical fibre comprising means for holding an optical fibre preform, a furnace for melting the tip of the preform at a predetermined temperature, means for feeding the preform into the furnace, means for sensing the fibre diameter a capstan for drawing the fibre from the preform, and a control system arranged to drive the preform into the furnace at a first predetermined rate and to drive the capstan at a second predetermined rate, and wherein the capstan drive rate is modified over short-terms in response to deviation from the fibre nominal diameter as measured by the fibre diameter monitor, and means for measuring the speed of the capstan, and a control algorithm for comparing the measured speed with the preset speed and arranged to provide a control signal for adjusting the first rate at which the preform is fed into the furnace.

* * * * *